C. E. WOODS.
COMBINED GOVERNOR AND SPEED INDICATOR FOR TALKING MACHINES.
APPLICATION FILED MAY 29, 1913.
1,253,328.
Patented Jan. 15, 1918.
3 SHEETS—SHEET 2.
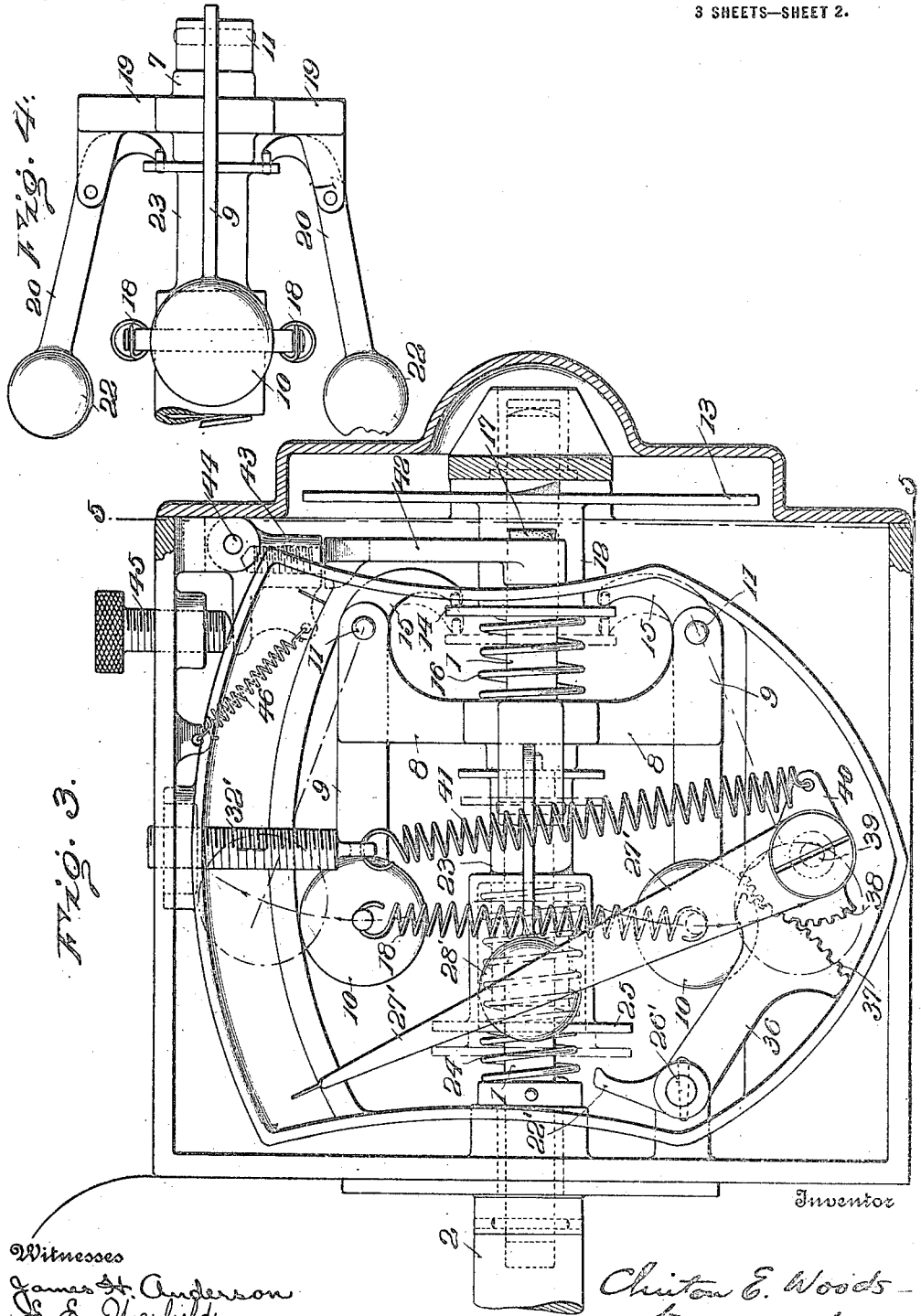
Witnesses
James H. Anderson
E. E. Warfield
Inventor
Clinton E. Woods
by
Mauro, Cameron, Lewis & Massie
Attorneys

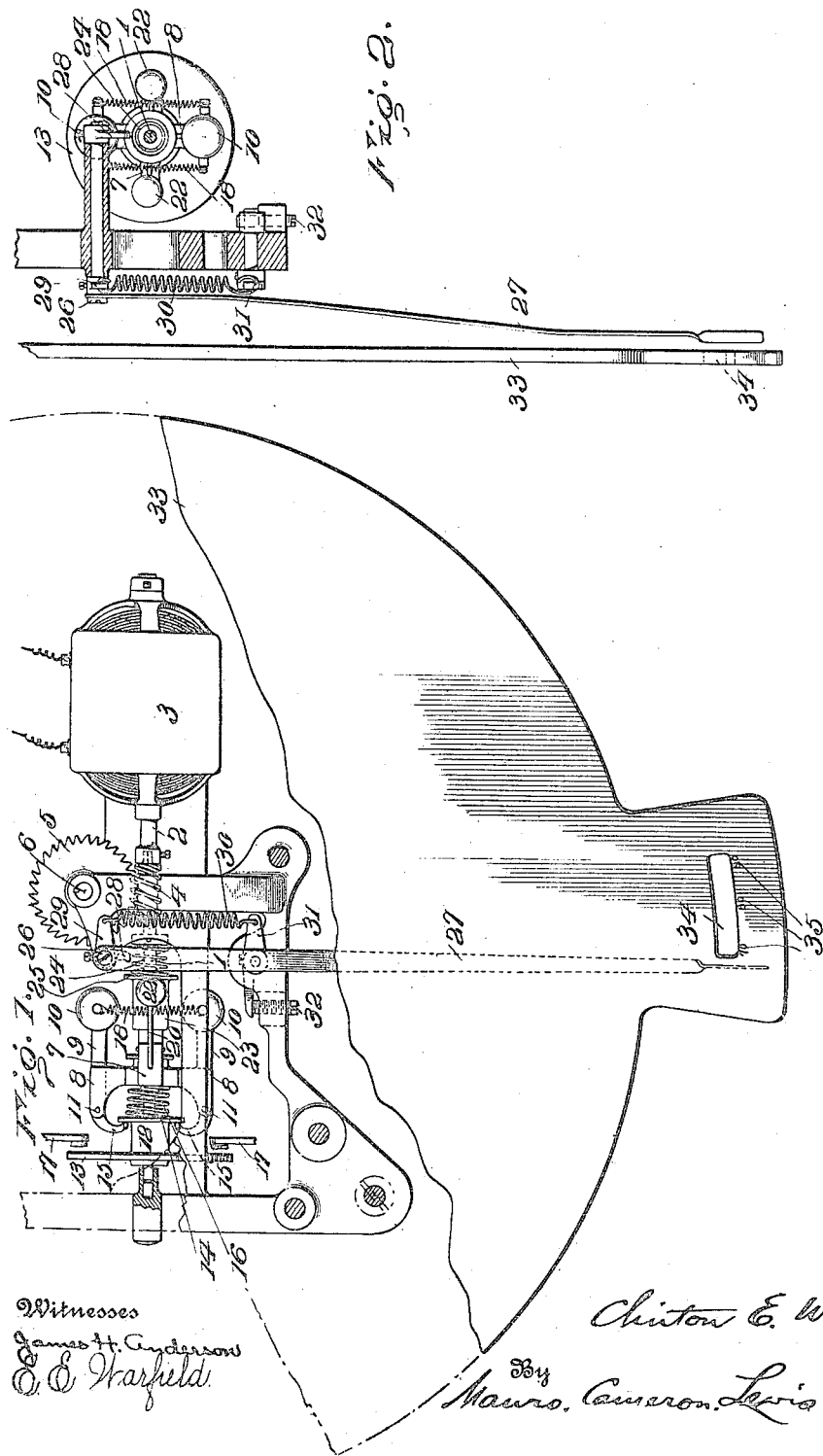

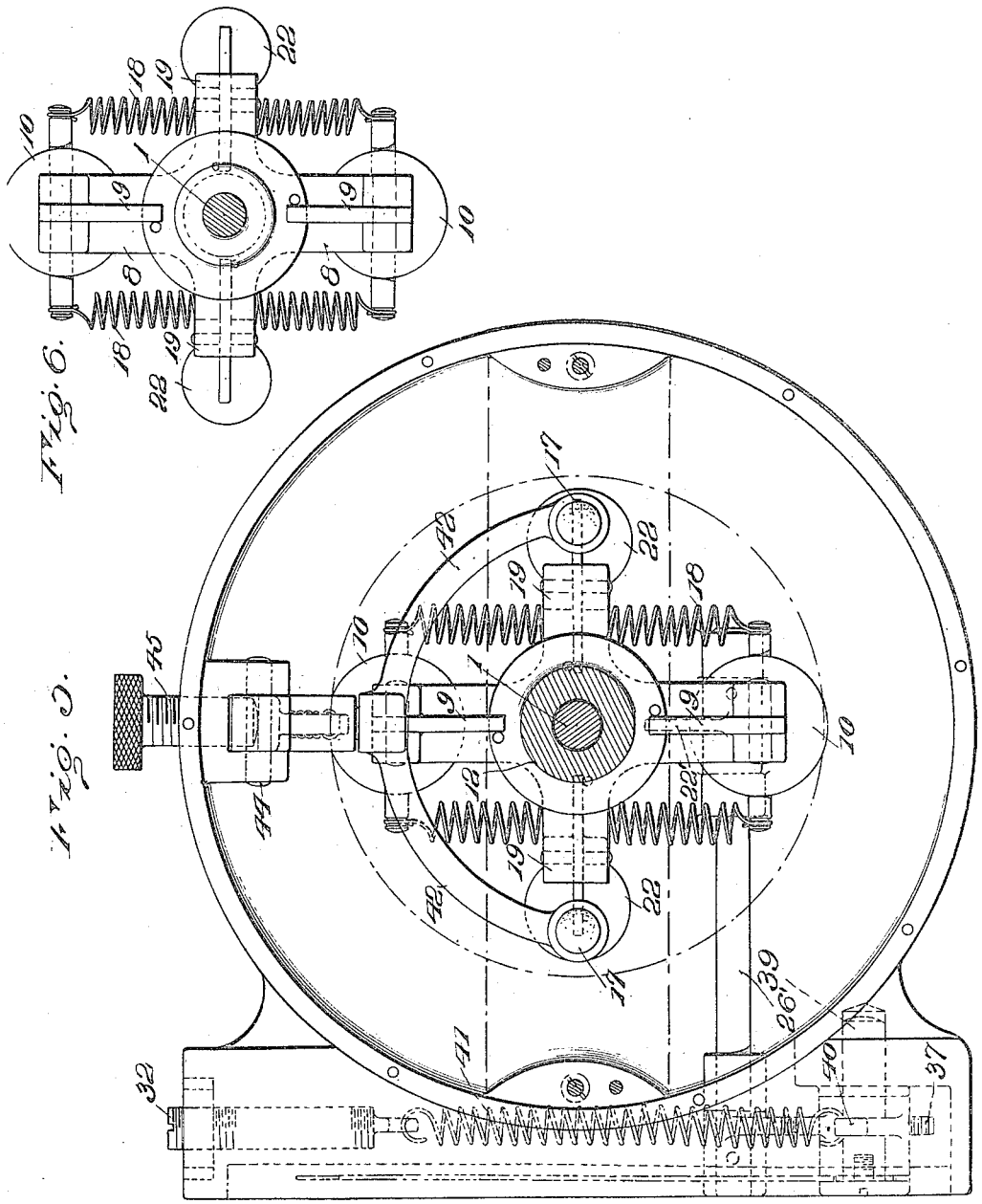

UNITED STATES PATENT OFFICE.

CLINTON E. WOODS, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

COMBINED GOVERNOR AND SPEED-INDICATOR FOR TALKING-MACHINES.

1,253,328.   Specification of Letters Patent.   Patented Jan. 15, 1918.

Application filed May 29, 1913. Serial No. 770,717.

*To all whom it may concern:*

Be it known that I, CLINTON E. WOODS, of Bridgeport, Connecticut, have invented a new and useful Combined Governor and Speed-Indicator for Talking-Machines, which invention is fully set forth in the following specification.

This invention relates to talking machines, and more particularly to means for both governing and indicating the speed at which the motor drives (revolves) the record tablet.

In talking machines the pitch of the reproduced sounds depends upon the speed at which the record groove is moved past the reproducing stylus; moreover it is desirable to reproduce the record at approximately the same speed at which the original record is made, since thereby the pitch and tone quality of the original sounds is obtained in the reproduction.

The object of the present invention is to provide means for governing the speed of revolution of the record, combined with means which shall accurately indicate the speed of revolution thereof, and with this object in view, the invention, generally stated, consists in two centrifugally operated means, one of which coacts with a suitable speed regulator, such as a friction device whereby the speed of the motor is controlled, and the other of which operates an indicator or pointer which, in conjunction with a suitable scale, enables the speed of revolution to be accurately determined, thereby rendering it possible for the operator (if the speed at which the original record is made is known) to adjust the speed of the machine to that at which the original record was made; and if the speed of the original record is not known, to so adjust the speed of the motor as to secure the best reproduction both as to pitch and tone quality.

The inventive idea is capable of receiving a variety of mechanical expressions, some of which, for the purpose of illustrating the invention, are shown in the accompanying drawings, but it is to be expressly understood that such drawings are for illustrative purposes only and are not designed to indicate the limits of the invention, reference being had to the appended claims for that purpose.

In said drawings:—

Figure 1 is a broken plan view of one embodiment of the invention;

Fig. 2 is a broken side elevation of certain of the parts;

Fig. 3 is a side elevation of another embodiment of the invention;

Fig. 4 is a broken detail;

Fig. 5 is a side elevation, partly in section, on the line 5—5 of Fig. 3;

Fig. 6 is a detail.

Referring to the drawings, in which like reference characters indicate like parts throughout the several views, and first to Figs. 1 and 2, 1 is the governor shaft, preferably formed integrally with or otherwise connected to or driven by the driving shaft 2 of any suitable motor, here shown as an electrical motor 3, said driving shaft being provided with a worm 4 actuating the worm gear 5 keyed to the turn-table shaft 6 which drives the turn-table of the machine, which table supports the record. Connected with and preferably mounted upon the shaft 1 is a centrifugal mechanism which preferably comprises two independently acting centrifugal means. The two centrifugal means are so connected to the shaft as to be driven at a fixed speed ratio, which is preferably 1:1, that is, they are driven at the same speed. For mounting and driving the centrifugal means there is preferably provided hub 7 fast on the governor shaft 1 and provided with two diametrically opposite radial arms 8, 8, which arms are slotted to receive bell-crank levers 9, 9, having the weights 10, 10, at one end and pivoted to the arms 8, 8, at the points 11, 11. Also mounted on the governor shaft, so as to turn therewith but to be free to slide thereon, is a sleeve 12 having a friction disk 13 at one end and a flange or lip 14 at the other end, which flange or lip is engaged by the inturned arms 15, 15, of the bell-crank levers 9, 9, the flange 14 being normally held in engagement with the arms 15, 15, by a spring 16 reacting between the left hand end of the hub 7 and the flange 14 on the sleeve 12. Suitable friction pads 17, 17, are mounted in any suitable way adjacent to the right-hand side of the disk 13, and the two centrifugal balls or weights 10, 10, may be, and in some cases are, connected by a suitable spring or springs, one of which 18 is shown in Fig. 1.

With the speed-regulator adjusted for full speed, movement of the disk 13 along the shaft while the shaft is rotating at low speeds is resisted only by the spring 16. For higher speeds, however, the movement is resisted by the pads 17—17. The pads come relatively suddenly into action and therefore the resistance to movement of the disk varies widely, the variation being non-proportionate to the variation in the rotative speed.

On the hub 7 are two radial arms 19, 19, diametrically opposite to each other and extending at right angles to the arms 8, 8. Mounted in said radial arms are two bell-crank levers 20, 20, shown in Fig. 6, each of said levers being pivoted in slots in the arms 19, 19, in a manner similar to the mounting of the levers 9, 9, in the arms 8, 8. Said bell-crank levers 20, 20, have at their outer ends centrifugal weights 22, 22, and the inturned arms of these levers engage the flanged end of a sleeve 23 mounted to slide upon the governor shaft 1, but being normally held in engagement with the bell-crank levers 20, 20, by a spring 24 reacting against a flange 25 on said sleeve and a suitable abutment at the other end of the spring.

A rock shaft 26 has an indicator arm or pointer 27 keyed thereto and also a dog 28 projecting into the path of the flange 25 on the sleeve 23. An arm 29 projects from the shaft 26, and is connected by a spring 30 to one end of a lever 31 fulcrumed in the framework of the machine and having an adjusting screw 32 bearing on the other end thereof, by means of which the tension of the spring may be adjusted.

The motor-board 33 of the machine is situated above the mechanism thus described, and has an indicating scale thereon. Preferably the motor-board is provided with a slot 34 adjacent the outer end of the pointer 27, so that when the pointer is moved, the end thereof moves under the slot 34, and adjacent to said slot there is a speed indicating scale, here shown as indicating the revolutions, seventy, eighty, or ninety per minute, as shown at 35. Any other suitable number of revolutions may be indicated, and the parts adjusted accordingly, but ordinarily the machines are designed to drive the records at a revolution of somewhere between seventy and ninety per minute, and in such case the scale shown in Fig. 1 would be employed.

The speed-regulator and the speed-indicator are preferably so constructed and connected that they do not normally become operative until a predetermined rotative speed is attained. In the construction illustrated in Fig. 1, the friction pads 17—17 and the dog 28 are, or may be, out of engagement with their respective disks when the mechanism is idle or is rotating at low speeds. It is only when the parts are rotated at higher speeds that the disks 13 and 25 are moved longitudinally to engage the pads and the dog. With this arrangement the minimum of resistance is offered to the rotative movement of the shaft when it is being started, thus permitting the motor to bring the parts quickly to approximately normal speed. As the normal speed is approached, the disk 13 engages the pads 17—17 and the disk 25 engages the dog 28, both the disks and the dog offering some resistance to rotative movement.

From an inspection of Fig. 1, it will be observed that, with the motor and the shaft 2 rotating in a direction necessary to turn the wheel 6 in the usual clockwise direction, there will be a reaction at the worm-and-wheel gearing tending to move the shaft 2 toward the right. But it will be observed that the pads 17—17 and the dog 28 press against the disks 13 and 25 respectively on the right-hand side thereof, thus resisting the general tendency of the shaft and the parts carried thereby to move toward the right. It will be seen that, by this arrangement, I have utilized the unavoidable pressure at the pads and at the dog to offset the unavoidable pressure resulting from the worm-and-wheel gearing, which would otherwise have to be taken entirely on the thrust bearing. With this arrangement, the thrust bearing is relieved of the major portion of the pressure which it would otherwise carry.

Referring to Fig. 3, the dog 28' is shown fast to a rock shaft 26', to which is also keyed an arm 36 having a gear segment 37 on its outer end engaging a segmental gear 38 on a rock shaft 39, to which is keyed the pointer 27'. Said rock shaft 39 also has an arm 40 keyed thereto, and a spring 41 extends between the outer end of said arm 40 and an adjusting screw 32' mounted in the frame of the machine, by means of which the tension of the spring 41, and therefore the position of the indicator arm 27', may be adjusted.

The friction pads 17, 17, (see Figs. 3 and 5) are here shown as mounted on the two branches 42, 42, of one arm of a bell-crank lever 43 fulcrumed at 44 and having an adjusting screw 45 mounted to turn in the frame of the machine and bearing on the other arm of said bell-crank lever. A spring 46 acts to hold the arm of the bell-crank lever in operative contact with the screw 45. The adjustment of the pads 17 relative to the friction disk 13 is secured by turning the screw 45, as will be readily understood.

As has already been pointed out in connection with the construction shown in Figs. 1 and 2, the friction pads and the dog for the speed-indicating mechanism are, or may be, out of engagement with their disks at low speeds, but come into engagement at higher speeds. From the description that has been given, it will be seen that I have provided means whereby the pads can be adjusted to vary the maximum speed at which they are out of engagement with the disks and at which the speed-regulator is inoperative; and that I have provided means whereby the dog 28 can be adjusted to vary the maximum speed at which it is out of engagement with the disk and at which the speed-indicator is inoperative.

Operation: In operation, the hub 7 being keyed to the governor shaft 1 turns therewith and the weights 10, 10, and 22, 22, move outward under the action of centrifugal force, and the friction disk 13 is drawn into contact with the friction pads 17, the speed of the motor being determined by the position of said pads, and the disk 25 is thrown into operative engagement with the dog 28, thereby operating the pointer arm which, in conjunction with the scale, will indicate the speed at which the motor is being driven. By providing two sets of centrifugally operated devices, one of which actuates the speed governor and the other of which actuates the speed indicator, I am enabled to avoid the factor of error which would result if the speed indicator and the speed governor were both actuated by the same centrifugally operated element. Up to the time when the friction disk engages the friction pads to control the speed of the motor, the position of such friction disk would vary relatively to the speed of the motor, but when the disk comes in contact with the pads, it acts to compress the same to a variable degree, and the greater the speed of the motor the greater will the pads be compressed, but the movement of the disk along the governor shaft will not be in proportion to the variations in speed, after the disk comes in contact with the pads. On the other hand, the movement of the disk 25 which actuates the dog 28 whereby the indicator arm or pointer is actuated, has its position controlled by the centrifugally operated balls 22, without the interference of any disturbing element and therefore the position of the disk 25 will vary relatively to and in proportion to the variations in speed, and therefore the position of this disk, which is indicated by the pointer arm and its accompanying scale, is a correct criterion of the speed of the motor.

It will thus be seen that by operating the speed governing mechanism and the speed indicating mechanism by two independent sets of centrifugally operated devices under the influence of the motor shaft, I am enabled simultaneously to govern or control the speed of the motor and also indicate such speed, and the speed indicator serves as a guide for the operator in adjusting the movements of the speed governor to secure the speed desired.

What I claim is:—

1. In a talking machine, in combination with a turn-table shaft for rotating a sound-record and a motor, a shaft driven by said motor, operative connections between said shafts, a centrifugal device rotated by said driven shaft, brake mechanism operatively connected therewith, a second centrifugal device rotated by said driven shaft and responsive to changes of speed of said first centrifugal device, and a speed indicator operatively connected with said second centrifugal device.

2. In a talking machine, in combination with a turn-table shaft for rotating a sound-record and a motor, a shaft driven by said motor, operative connections between said shafts, a hub carried by said driven shaft, two centrifugal devices mounted on said hub, a brake mechanism operatively connected to one of said centrifugal devices, and a speed indicator operatively connected to the other of said centrifugal devices.

3. In a talking machine, in combination with a turn-table shaft for rotating a sound-record and a motor, a shaft driven by said motor, operative connections between said shafts, a centrifugal speed-governing mechanism mounted on said driven shaft, a second centrifugal device mounted on said driven shaft and responsive to changes of speed of said speed-governing mechanism, and a speed indicator operatively connected with said second centrifugal device independently of said speed-governing mechanism.

4. In a talking machine, in combination with a turn-table shaft for rotating a sound-record and a motor, a shaft driven by said motor, operative connections between said shafts, a sleeve rotating with said driven shaft and movable longitudinally thereon, said sleeve carrying one member of a brake mechanism, a second sleeve rotating with said driven shaft and longitudinally movable thereon, a speed indicator operatively connected with said second sleeve, and two centrifugal devices mounted on said driven shaft, each of said centrifugal devices being operatively related to one of said sleeves.

5. In a talking machine, in combination with a turn-table shaft for rotating a sound-record and a motor, a shaft driven by said motor, operative connections between said shafts, a centrifugal device rotated by said driven shaft, brake mechanism operatively connected therewith, a second centrifugal device rotated by said driven shaft and responsive to changes of speed of said first centrifugal device, a speed indicator comprising a pointer and a scale, said pointer being operatively connected with said second centrifugal device, and means for adjusting said pointer relatively to said second centrifugal device.

6. In a talking machine, in combination with a turn-table shaft for rotating a sound-record and a motor, a shaft driven by said motor, operative connections between said shafts, a hub carried by said driven shaft, two sets of centrifugal devices independently mounted on said hub, a sleeve at one end of said hub rotating with and movable longitudinally on said driven shaft, a second sleeve at the other end of said hub rotating with and movable longitudinally on said driven shaft, each of said sleeves being operatively related to one of said sets of centrifugal devices whereby it may be moved longitudinally of the driven shaft thereby, brake mechanism associated with one of said sleeves, and a speed indicator operatively connected to the other of said sleeves.

7. In a talking machine, the combination of a driven shaft, a speed-indicating device consisting of a scale and pointer, a centrifugally operated element on said shaft, and operating means comprising two parts respectively connected with said element and said pointer, the said parts being out of engagement at low speeds and in engagement at high speeds.

8. In a talking machine, a driven shaft, a sleeve mounted on said shaft, a centrifugal device imparting longitudinal movement to said sleeve with relation to said shaft, an indicating pointer and scale, a shaft on which said pointer is mounted, and a dog on said shaft projecting into the path of said sleeve, the sleeve being movable in one direction independently of the dog.

In testimony whereof I have signed this specification in the presence of two subscribing witnesses.

CLINTON E. WOODS.

Witnesses:
JOHN R. PETRIE,
J. S. GRIFFITH.

Copies of this patent may be obtained for five cents each, by addressing the "Commissioner of Patents, Washington, D. C."